United States Patent
Chen et al.

(10) Patent No.: US 11,625,313 B2
(45) Date of Patent: Apr. 11, 2023

(54) AGGREGATED VIEW OF TASK PERFORMANCE DATA

(71) Applicant: Microsoft Technology Licensing, LLC, Redmond, WA (US)

(72) Inventors: Danny Chen, Woodinville, WA (US); James D Laflen, Mercer Island, WA (US); Colin Mical Francis, Seattle, WA (US); Steven John Pratschner, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 17/237,893

(22) Filed: Apr. 22, 2021

(65) Prior Publication Data
US 2022/0342798 A1   Oct. 27, 2022

(51) Int. Cl.
G06F 9/44 (2018.01)
G06F 11/36 (2006.01)

(52) U.S. Cl.
CPC ...... *G06F 11/3612* (2013.01); *G06F 11/3664* (2013.01); *G06F 11/3688* (2013.01); *G06F 11/3692* (2013.01)

(58) Field of Classification Search
CPC ............. G06F 11/3612; G06F 11/3664; G06F 11/3688; G06F 11/3692
See application file for complete search history.

(56) References Cited

U.S. PATENT DOCUMENTS

| | | | | |
|---|---|---|---|---|
| 8,230,059 B1* | 7/2012 | Santos | ............... | G06F 11/3466 718/1 |
| 2006/0248401 A1* | 11/2006 | Carroll | ............... | G06F 11/3664 714/E11.2 |
| 2009/0007075 A1* | 1/2009 | Edmark | ............. | G06F 11/3612 717/128 |
| 2011/0107305 A1* | 5/2011 | Baron | ................. | G06F 11/3664 717/125 |
| 2011/0283266 A1* | 11/2011 | Gallagher | ................. | G06F 9/44 717/130 |
| 2012/0005658 A1* | 1/2012 | Bansal | ................. | G06F 11/3419 717/128 |
| 2012/0079408 A1* | 3/2012 | Rohwer | ................. | G06Q 10/06 715/772 |
| 2016/0110277 A1* | 4/2016 | Edmondson | ........ | G06F 11/3452 718/102 |

* cited by examiner

*Primary Examiner* — Hang Pan
(74) *Attorney, Agent, or Firm* — Alleman Hall Creasman & Tuttle LLP

(57) ABSTRACT

A computing device is provided, including a processor configured to execute an application-under-test including a plurality of tasks. Each task may be executed in one or more task instances. The processor may determine respective performance data for the one or more task instances of each task. The processor may output, for display on a display, a graphical user interface (GUI) including a statistical representation of the performance data. The processor may receive, at the GUI, a selection of a task executed in a plurality of selected task instances in the application-under-test. The selected task instances may be executed in selected task execution time intervals that are at least partially non-contiguous in time. The processor may generate an aggregated view of the corresponding performance data for the selected task instances aggregated over the selected task execution time intervals. The processor may output the aggregated view for display at the GUI.

20 Claims, 13 Drawing Sheets

FIG. 6A

| Aa | * | Filter | | Time Range: | 4:11.61 at 113.83 ms | | |
|---|---|---|---|---|---|---|---|

46

| Inc. % | Exc. % | Name | Inc. # | Exc. # | Threads |
|---|---|---|---|---|---|
| 99.83% | 0.00% | ▶ ntdll!RtlUserThreadStart | 39,680 | 0 | 3 |
| 99.83% | 0.00% | ▶ ucrtbase!thread_start<unsigned int (__cdecl*)(void*),1> | 39,680 | 0 | 3 |
| 99.83% | 0.00% | ▶ MockGameX!std::thread::_Invoke<std::tuple<void (__cdec | 39,680 | 0 | 3 |
| 60.87% | 0.01% | ▶ MockGameX!WorkerManager<70,2000>::ProcessingThread | 24,194 | 3 | 1 |
| 60.87% | 3.29% | ▶ MockGameX!WorkerManager<70,2000>::TaskWrapper | 24,194 | 1,307 | 1 |
| 60.71% | 20.78% | ▶ MockGameX!ArbitraryGameCode<Audio,1>::X | 24,132 | 8,259 | 1 |
| 52.31% | 1.49% | ▶ MockGameX!ArbitraryGameCode<WorkerManager<70,1000>> | 20,793 | 591 | 1 |
| 29.60% | 1.14% | ▶ MSVCP140!_Query_perf_counter | 11,765 | 454 | 1 |
| 1.14% | 0.37% | MSVCP140!_Query_perf_frequency | 454 | 149 | 1 |
| 0.37% | 0.35% | MockGameX!_Query_perf_counter | 149 | 140 | 1 |
| 0.35% | 0.00% | MockGameX!_Query_perf_frequency | 140 | 14 | 1 |
| 0.04% | 0.03% | ▶ MockGameX!PerfWrap::TimedPerfEvent::TimedPerf | 0 | 12 | 1 |
| 0.03% | 0.25% | MockGameX!PerfWrap::TimedPerfEvent::~TimedPerf | 12 | 100 | 1 |
| 4.78% | 0.15% | ▶ MSVCP140!_Query_perf_counter | 1,901 | 59 | 1 |
| 0.15% | 0.06% | MSVCP140!_Query_perf_frequency | 59 | 24 | 1 |
| 0.06% | 0.05% | MockGameX!_Query_perf_counter | 24 | 21 | 1 |
| 0.05% | 0.04% | MockGameX!_Query_perf_frequency | 21 | 14 | 1 |
| 0.04% | 0.00% | ▶ MockGameX!PerfWrap::TimedPerfEvent::TimedPerf | 14 | 0 | 1 |
| 0.03% |  | MockGameX!PerfWrap::TimedPerfEvent::~TimedPerf | 13 |  | 1 |

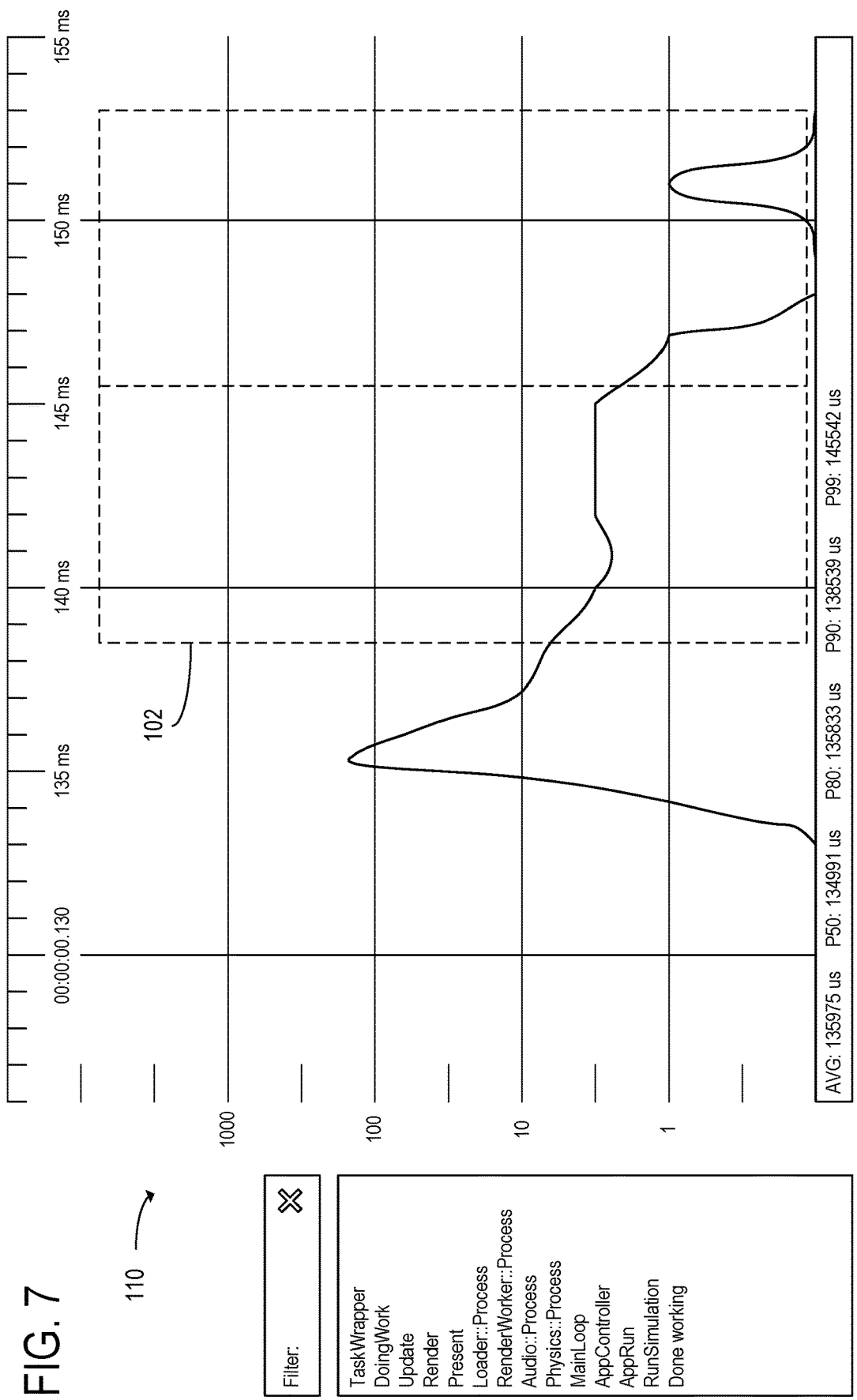

AGGREGATED VIEW OF TASK PERFORMANCE DATA

BACKGROUND

In software systems such as game engines and cloud-based web services, the workloads of programs include multiple tasks that are performed when the programs are executed. The performance requirements of these programs are typically expressed by the ability for each discrete task to complete within a target duration rather than the average execution time of the overall software. In game engines in particular, the target duration is commonly referred to as a performance "budget" which may be met or exceeded. It will be appreciated that when executing a program on a multithreaded operating system running on a networked computer that relies on other network resources to perform its operations, designing a software system that guarantees performance within a target duration can be very difficult. Unpredictable factors, such as processor and memory resources occupied by other tasks handled in parallel by the multithreaded operating system, communication delays with other system components, etc., can impede performance in ways that are difficult to predict. Such delay issues can be further compounded when executing software in virtualized environments. For such systems, software developers specify a timing performance target for a task in terms of the percentage of task instances for that task that are to be accomplished within the target duration. For example, a "P90" performance target for a task refers to the goal of completing 90 percent of instances of a given task prior to the target deadline. As discussed below, challenges exist in measuring the performance of software in a way that can aid developers in designing software that consistently meets such performance targets.

SUMMARY

According to one aspect of the present disclosure, a computing device is provided, including a processor configured to execute an application-under-test including a plurality of tasks. Each task of the plurality of tasks may be executed in one or more task instances. The processor may be further configured to determine respective performance data for the one or more task instances of each task included in the application-under-test. The processor may be further configured to output, for display on a display, a graphical user interface (GUI) including a statistical representation of the performance data. The processor may be further configured to receive, at the GUI, a selection of a task of the plurality of tasks. The selected task may be executed in a plurality of selected task instances in the application-under-test. The plurality of selected task instances may be executed in a respective plurality of selected task execution time intervals that are at least partially non-contiguous in time. In response to receiving the selection of the selected task, the processor may be further configured to generate an aggregated view of the corresponding performance data for the plurality of selected task instances aggregated over the plurality of selected task execution time intervals. The processor may be further configured to output the aggregated view for display at the GUI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A shows an example table representation of performance data included in an aggregated view, according to the example of FIG. 1.

FIG. 7 shows an example histogram of the execution durations of selected task instances, according to the example of FIG. 1.

DETAILED DESCRIPTION

Sampling-based profiling is one conventional technique for measuring the performance of software. To obtain precise results using sampling-based profiling, significant amounts of data must be pooled together. When sampling-based profiling is performed, performance data from temporally contiguous measurement periods are pooled. Accordingly, the user may only view the average case behavior of the software rather than outlier behaviors. Additionally, for identifying the behavior of an individual task, a suitable, continuous, period of time encompassing the task must be chosen to perform the analysis. Thus, sampling-based profiling may be ill-suited for the workloads described above, since sampling-based profiling is only capable of analyzing a single instance of a task executing rather than collective behavior of the task. For tasks which are performed quickly relative to the sampling period of the profiler, a single instance may not have a long enough measurement period to obtain a representative performance profile for the task.

In order to address the above challenges, the systems and methods discussed below are provided. These systems and methods enable a performance analysis tool to pool non-contiguous, but related, performance data in order to accurately measure the performance characteristics of individual repeated tasks. Thus, a user may view the collective behavior of multiple task instances and may identify outlier behaviors of a task.

Figure 1:
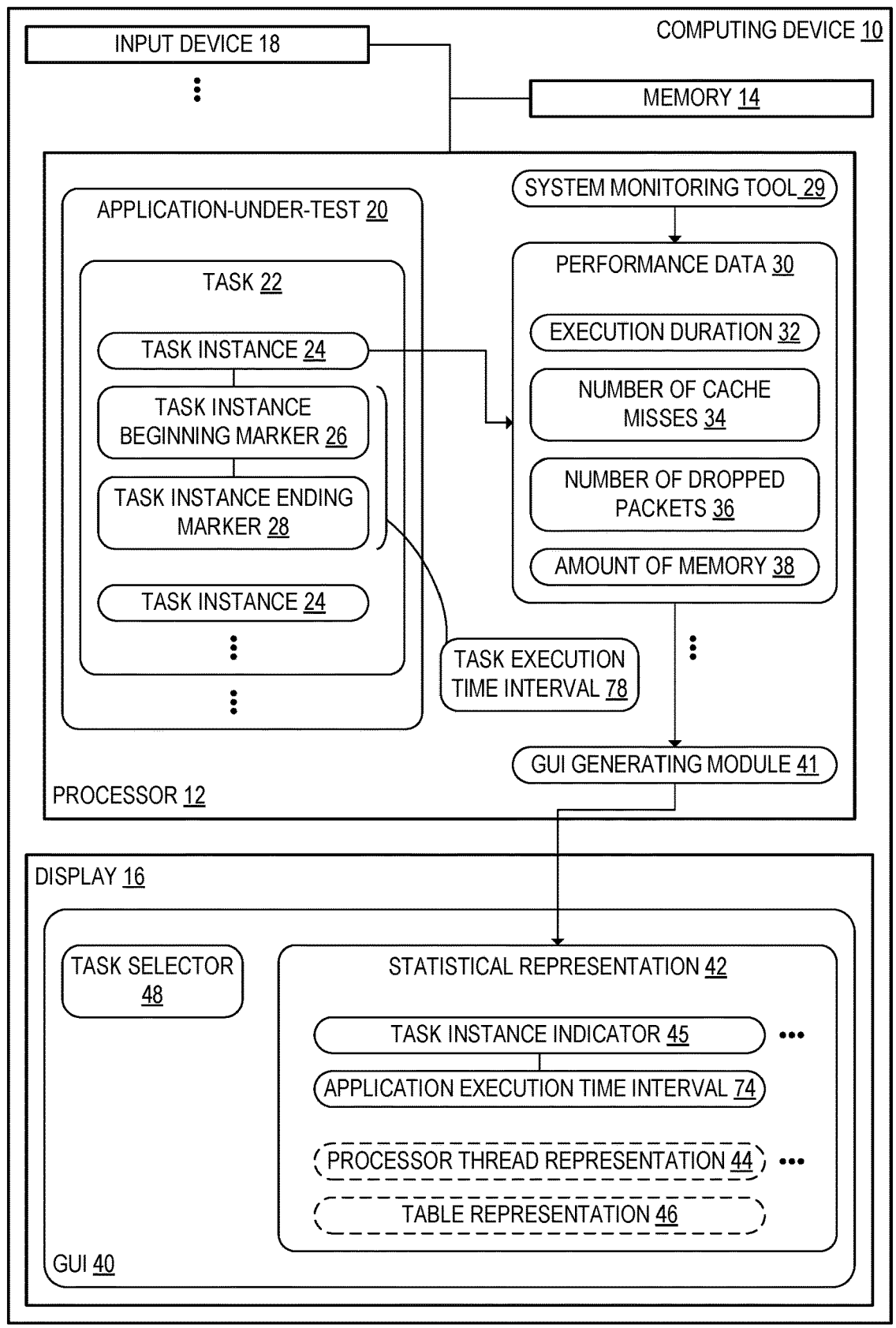
FIG. 1 schematically shows an example computing device including a processor configured to execute an application-under-test, according to one embodiment of the present disclosure.

FIG. 1 schematically depicts a computing device 10 according to one example embodiment. The computing device 10 may include a processor 12, which may include one or more processor cores and may be configured to execute one or more processor threads to process data. The computing device 10 may further include memory 14 that is operatively coupled to the processor 12. For example, the memory 14 may include volatile memory and/or non-volatile memory. The computing device 10 may be configured to transfer data between the processor 12 and the memory 14 for processing and storage, respectively.

The computing device 10 may further include a display 16. In some examples, the computing device 10 may include one or more other output devices such as a speaker or a haptic feedback device. In addition, the computing device 10 may include one or more input devices 18. For example, the one or more input devices 18 may include a keyboard, a mouse, a trackpad, a touchscreen, an accelerometer, a microphone, and/or one or more other types of input devices.

In some examples, the computing device 10 may be instantiated in a plurality of communicatively linked computing devices rather than in a single physical computing device. For example, components of the computing device 10 may be distributed between a plurality of physical computing devices located in a data center and connected via a wired network. Processes executed at the processor 12 may be distributed between the respective processors of the plurality of communicatively linked computing devices. In addition, data stored in the memory 14 may be distributed between a plurality of memory devices located at different physical devices.

As shown in the example of FIG. 1, the processor 12 may be configured to execute an application-under-test 20 including a plurality of tasks 22. For example, the application-under-test 20 may be a video game, a cloud-based web service, or some other type of application. Each task 22 may, for example, be a function or a sub-function included in the application-under-test 20. The plurality of tasks 22 may be arranged in a hierarchical structure within the application-under-test 20, such that one or more of the tasks 22 include other tasks 22 that are lower in the hierarchy. Each task 22 of the plurality of tasks 22 may be executed in one or more task instances 24. For example, the application-under-test 20 may include a loop in which a task 22 is repeatedly executed.

In some examples, the application-under-test 20 may be instrumented with a plurality of task instance beginning markers 26 and a plurality of task instance ending markers 28 respectively associated with the plurality of task instances 24. A task instance beginning marker 26 and a task instance ending marker 28 may respectively indicate the beginning and ending points of a task instance 24. In some examples, a task instance ending marker 28 may act as a task instance beginning marker 26 for a subsequent task instance 24.

As an alternative to demarcation of the plurality of task instances 24 via task beginning markers 26 and task ending markers 28, the processor 12 may be configured to identify the plurality of task instances 24 according to function names included in the application-under-test 20. In such examples, each function name may correspond to a task 22.

When the application-under-test 20 is executed, the processor 12 may be further configured to determine respective performance data 30 for the one or more task instances 24 of each task 22 included in the application-under-test 20. The performance data 30 for the plurality of task instances 24 may be determined at a system monitoring tool 29 executed at the processor 12, which may, for example, be configured to track utilization of one or more hardware devices (e.g., CPU, GPU, memory, communications interface, fan, etc.) and/or software services using these hardware resources, included in the computing device 10. In some examples, rather than determining performance data 30 for the task instances 24 of each task 22, the processor 12 may be configured to determine performance data 30 for only a subset of the plurality of tasks 22 or for a subset of the task instances 24 of at least one task 22. The respective performance data 30 for the plurality of task instances 24 may include respective execution durations 32 of the plurality of task instances 24. In examples in which the plurality of task instances 24 are instrumented with respective task instance beginning markers 26 and task instance ending markers 28, the system monitoring tool 29 executed at the processor 12 may be configured to determine the respective execution durations 32 of the task instances 24 by identifying times at which the task instance beginning markers 26 and the task instance ending markers 28 occur. Thus, the processor 12 may be configured to identify a plurality of task execution time intervals 78 that each begin when execution of a task instance 24 begins and end when execution of that task instance 24 ends.

Additionally or alternatively to execution duration 32, the processor 12 may be configured to determine other performance data 30 for the plurality of task instances 24. In some examples, the respective performance data for the plurality of task instances 24 includes respective numbers of cache misses 34 for the plurality of task instances 24. Since cache misses lead to execution delays when requested data is retrieved from higher levels of memory, the number of cache misses 34 associated with a task instance 24 may indicate the extent to which execution of the task instance 24 is slowed down by retrieval of uncached data.

In examples in which the application-under-test 20 utilizes communication between multiple computing devices over a network, the respective performance data 30 for the plurality of task instances 24 may include respective numbers of dropped packets 36 for the plurality of task instances 24. For example, numbers of dropped packets 36 may be included in the performance data 30 when the application-under-test is a cloud-based web service or a video game that utilizes server-side rendering. When the numbers of dropped packets 36 are included in the performance data 30, the user may more easily diagnose whether slow execution of a task 22 is a result of an unreliable network connection.

As another example, the respective performance data 30 for the plurality of task instances 24 may include respective amounts of memory 38 allocated to the plurality of task instances 24. Including the amounts of memory 38 allocated to task instances 24 in the performance data 30 may allow the user to identify tasks 22 that are using unusually large amounts of memory.

Subsequently to determining the performance data 30 for the one or more task instances 24, the processor 12 may be further configured to output, for display on the display 16, a graphical user interface (GUI) 40 including a statistical representation 42 of the performance data 30. For example, the statistical representation 42 may include a table or a plot of one or more quantities included in the performance data 30. The GUI 40 may be generated at a GUI generation module 41 that is executed at the processor 12 and may, for example, be configured to populate a template with the performance data 30 when the GUI 40 is generated. In examples in which the computing device 10 is a server computing device that is configured to communicate with a client computing device, the processor 12 may be configured to transmit the statistical representation 42 to the client computing device.

In examples in which the processor 12 concurrently executes a plurality of processor threads when executing the application-under-test 20, the statistical representation 42 of the performance data 30 may include a plurality of processor thread representations 44 of the respective processor threads. Additionally or alternatively, the statistical representation 42 of the performance data 30 may be a table representation 46. When the performance data 30 is shown in a table representation 46, one or more tasks 22 may be displayed in the table representation 46 alongside one or more corresponding performance data values for those tasks 22.

Figure 2A:
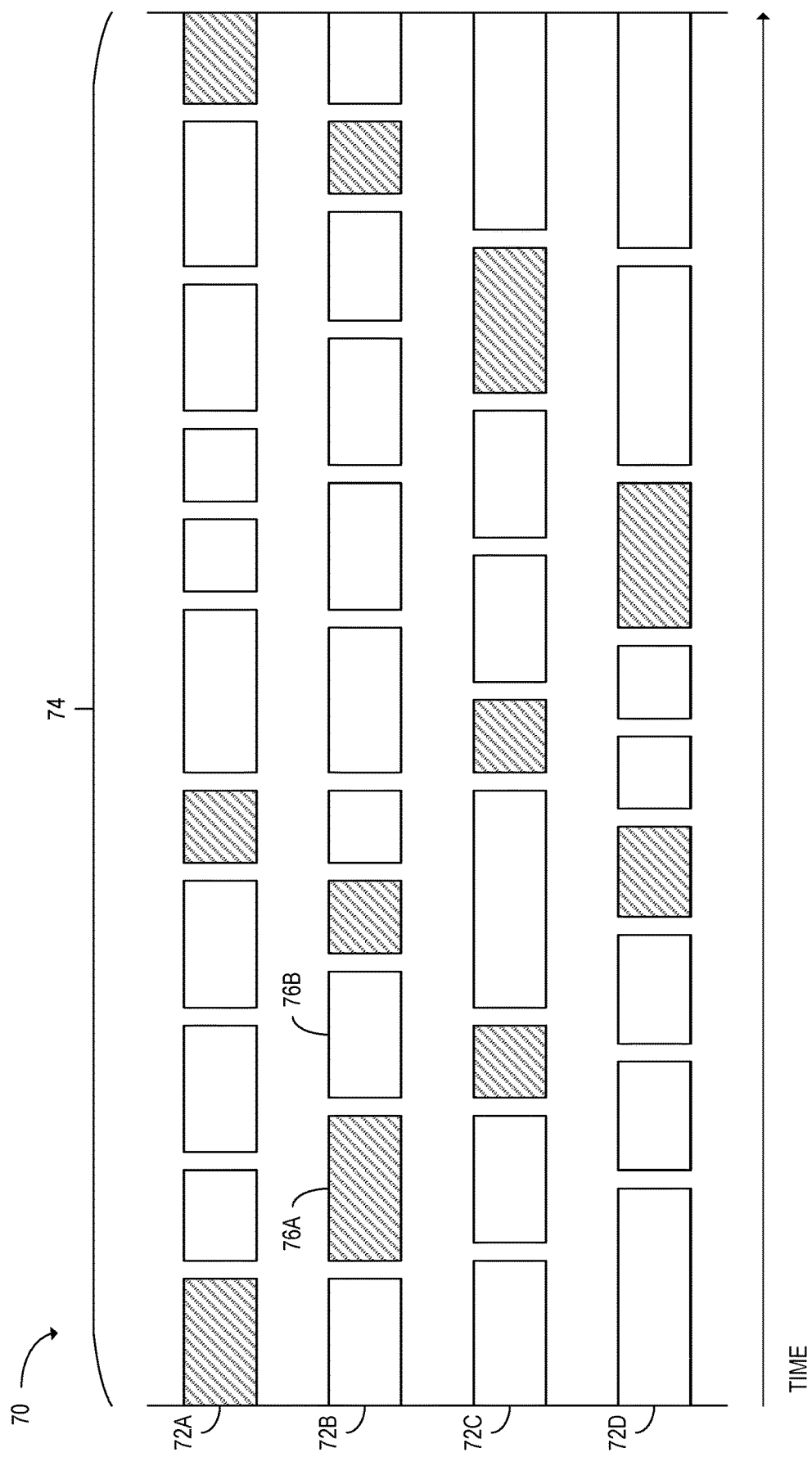
FIG. 2A shows an example processor thread timeline for an application execution time interval, according to the example of FIG. 1.

FIG. 2A schematically shows a processor thread timeline 70 of a first processor thread 72A, a second processor thread 72B, a third processor thread 72C, and a fourth processor thread 72D during an application execution time interval 74 in which the application-under-test 20 is executed. The application execution time interval 74 may be the entire period of time for which the application-under-test 20 is executed, or may alternatively be only a portion of the entire period. Within the application execution time interval 74 shown in FIG. 2A, a plurality of first task instances 76A of a first task and a plurality of second task instances 76B of a second task are executed at the processor 12. In the example of FIG. 2A, analysis of the plurality of first task instances 76A of the first task may be performed. According to one conventional technique of analyzing sampled performance data 30, the performance data 30 of the first processor thread 72A, the second processor thread 72B, the third processor thread 72C, and the fourth processor thread 72D may be pooled over the entire application execution time interval 74. However, when performance data 30 is pooled in this manner, the pooled performance data is not specific to the first task, but instead describes the application-under-test 20 as a whole during the application execution time interval 74. Thus, pooling performance data 30 over the entire application execution time interval 74 may be unsuitable for identifying specific tasks 22 that have anomalous performance behavior.

Figure 2B:
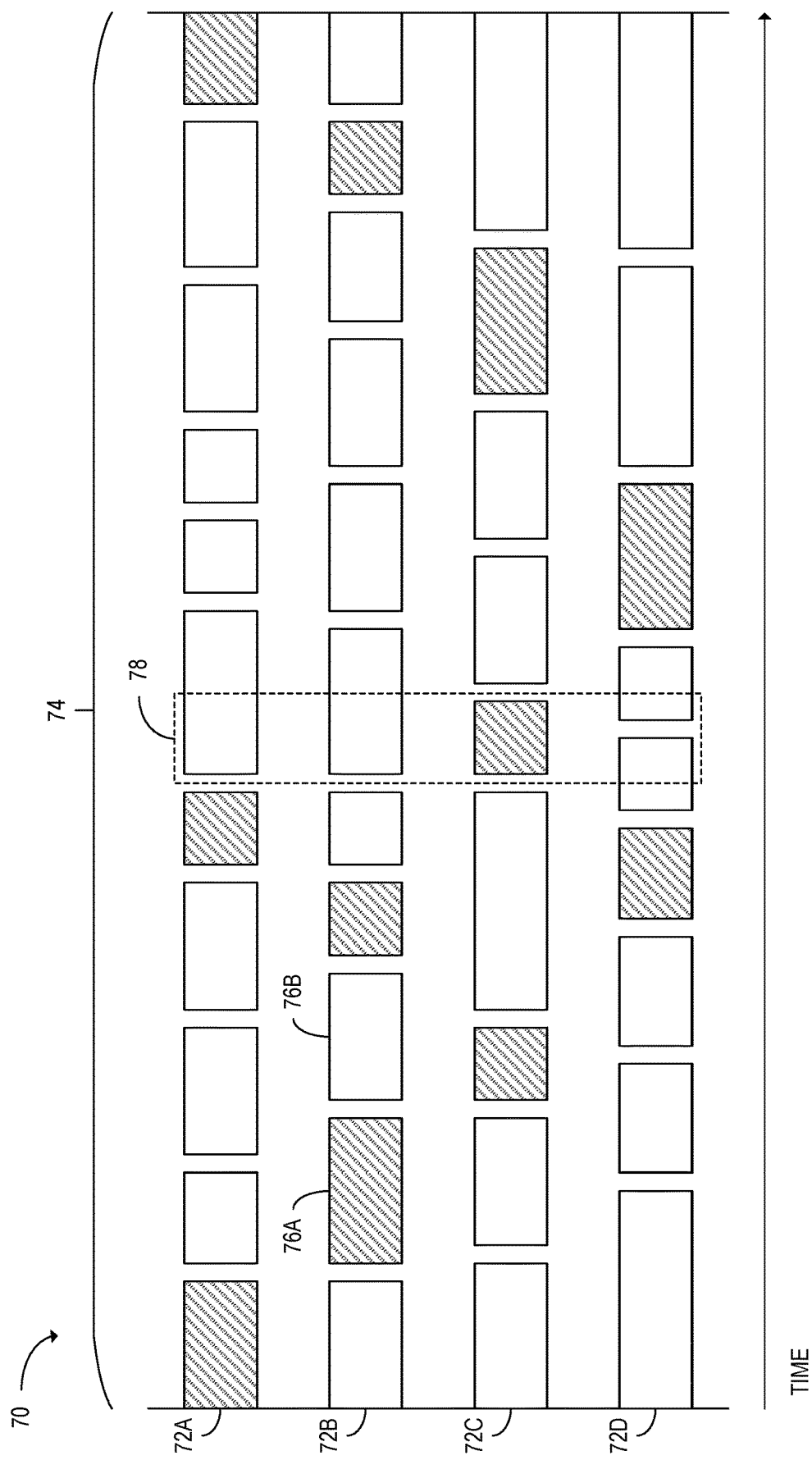
FIG. 2B shows the example processor thread timeline of FIG. 2A when performance data for the processor threads is pooled within a task execution time interval.

FIG. 2B shows the example processor thread timeline 70 of FIG. 2A when another conventional technique of analyzing sampled performance data 30 is performed. In the example of FIG. 2B, performance data 30 for the processor threads is pooled within a task execution time interval 78 corresponding to an uninterrupted period of execution of the first task. However, since the first task is executed in a plurality of non-contiguous intervals in the example of FIG. 2B, the sample of the performance data 30 selected using this conventional sampling technique only includes one first task instance 76A. Thus, when gaps occur between task instances 24 of a task 22, sampling a contiguous task execution time interval 78 may provide insufficient data with which to assess performance of the task 22.

Figure 2C:
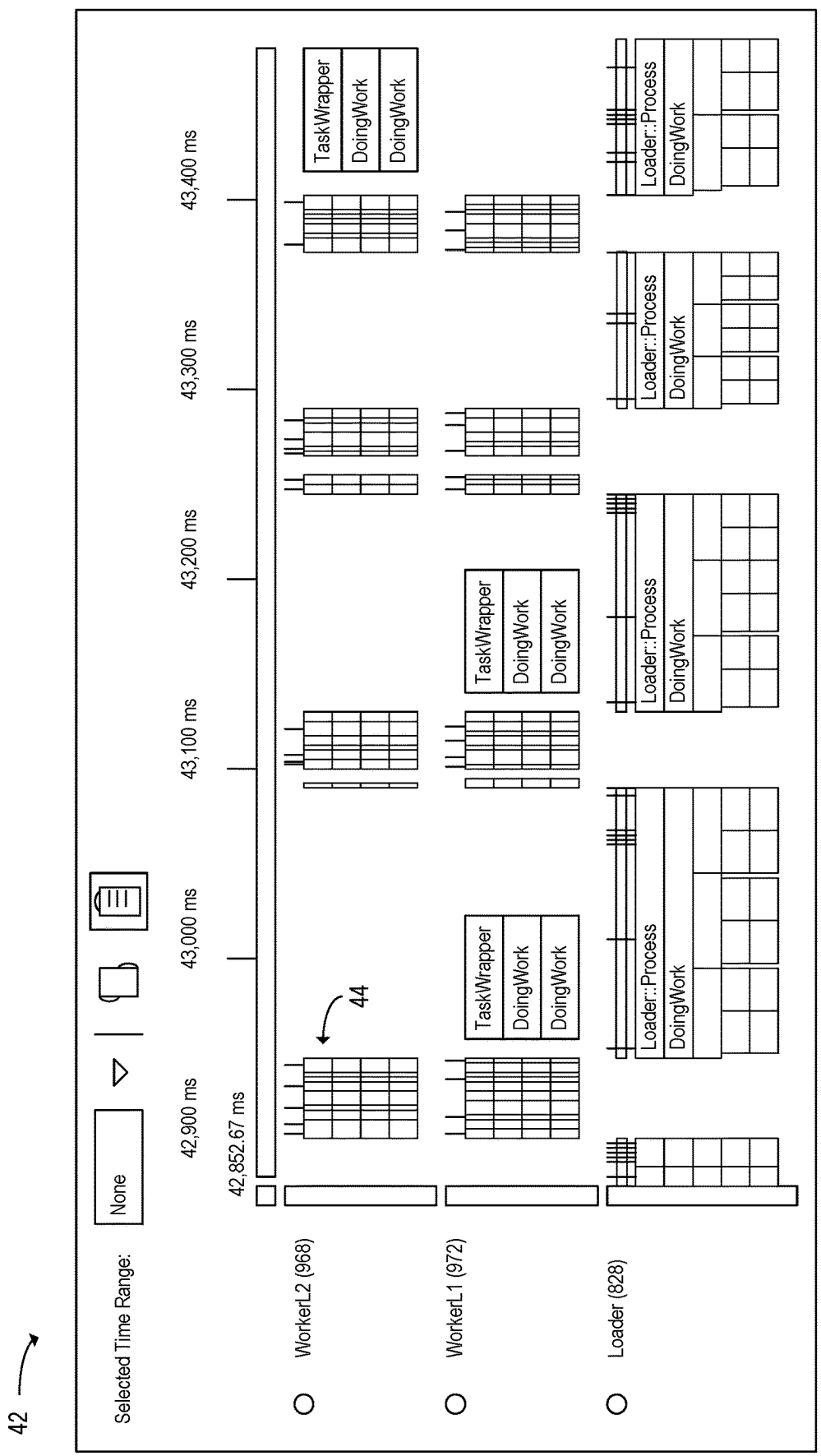
FIG. 2C shows an example statistical representation of performance data for the application-under-test, including a plurality of processor thread views, according to the example of FIG. 1.

FIG. 2C shows a statistical representation 42 of the performance data 30 for the application-under-test 20 in an example in which the statistical representation 42 includes a plurality of processor thread representations 44. In the example of FIG. 2C, performance data 30 is shown for an application execution time interval 74, which may be a portion of the total execution time of the application-under-test 20. The application execution time interval 74 may be selected by the user at the GUI 40. In the application execution time interval 74 shown in FIG. 2C, executing the application-under-test 20 includes repeatedly executing a plurality of tasks 22.

Figure 3:
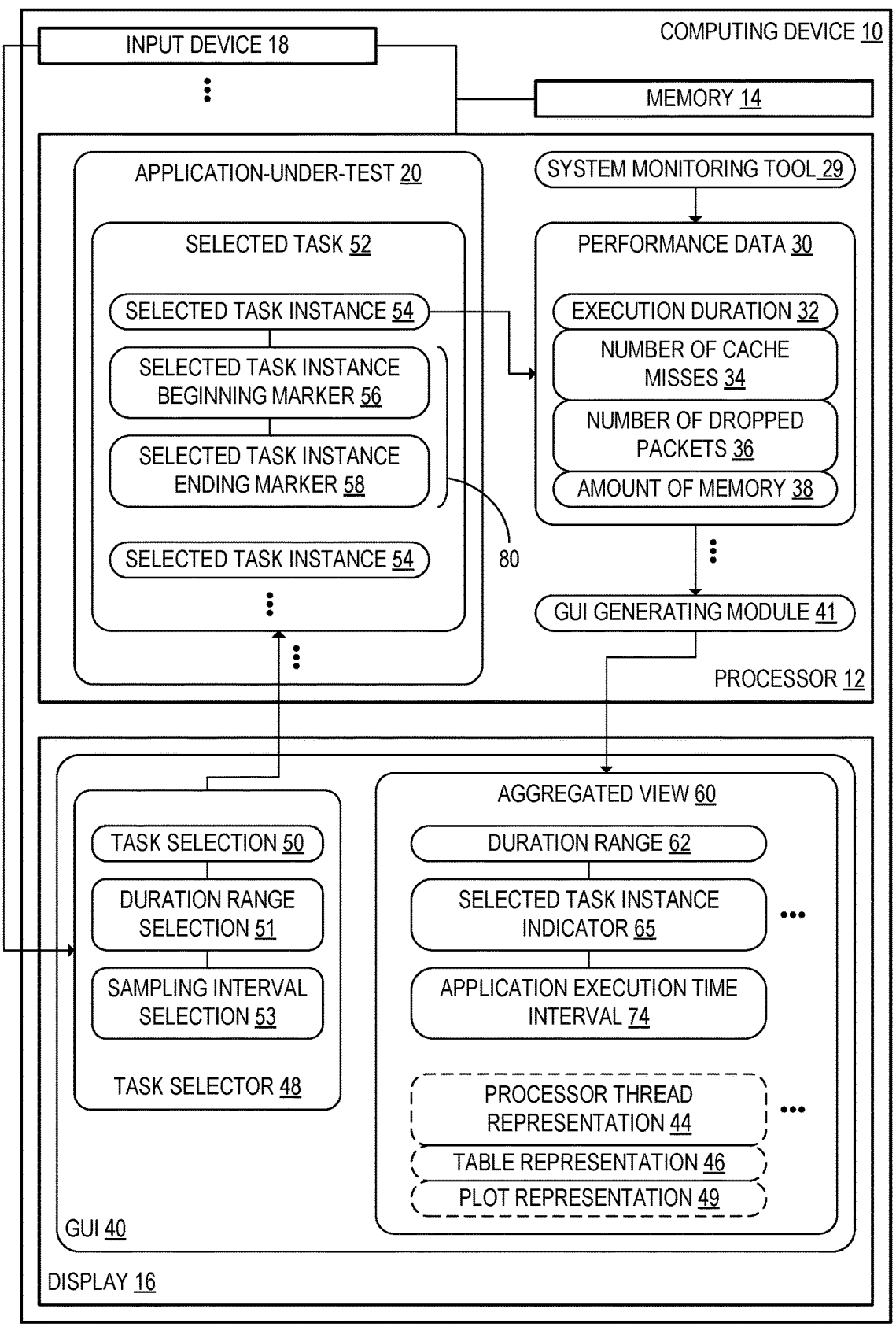
FIG. 3 schematically shows the example computing device of FIG. 1 when a task selection is received at a graphical user interface (GUI).

Returning to FIG. 1, in addition to the statistical representation 42 of the performance data 30, the GUI 40 may further include a task selector 48 at which the user may provide user input to select a task 22 of the plurality of tasks 22 included in the application-under-test 20. FIG. 3 shows the computing device 10 of FIG. 1 when a task selection 50 is received at the task selector 48. As shown in the example of FIG. 3, the processor 12 may be configured to receive, at the GUI 40, a selection of a selected task 52 of the plurality of tasks 22. The task selection 50 may be received via user interaction with the one or more input devices 18. The selected task 52 may be a task 22 that is executed in a plurality of selected task instances 54 in the application-under-test 20. When the application-under-test 20 is executed, the plurality of selected task instances 54 may be executed in a respective plurality of selected task execution time intervals 80 that are at least partially non-contiguous in time. In some examples, each selected task execution time interval 80 may be demarcated by a selected task instance beginning marker 56 and a selected task instance ending marker 58.

In response to receiving the selection 50 of the selected task 52, the processor 12 may be further configured to generate an aggregated view 60 of the corresponding performance data 30 for the plurality of selected task instances 54 aggregated over the plurality of selected task execution time intervals 80. In the aggregated view 60, the performance data 30 for tasks 22 other than the selected task 52 may be hidden. As discussed in further detail below, the aggregated view 60 may include at least one of a processor thread representation 44, a table representation 46, or a plot representation 49.

Subsequently to generating the aggregated view 60, the processor 12 may be further configured to output the aggregated view 60 to the display 16 for display at the GUI 40. In examples in which the computing device 10 is a server computing device configured to communicate with a client computing device, the processor 12 may be configured to transmit the aggregated view to the client computing device.

Figure 4A:
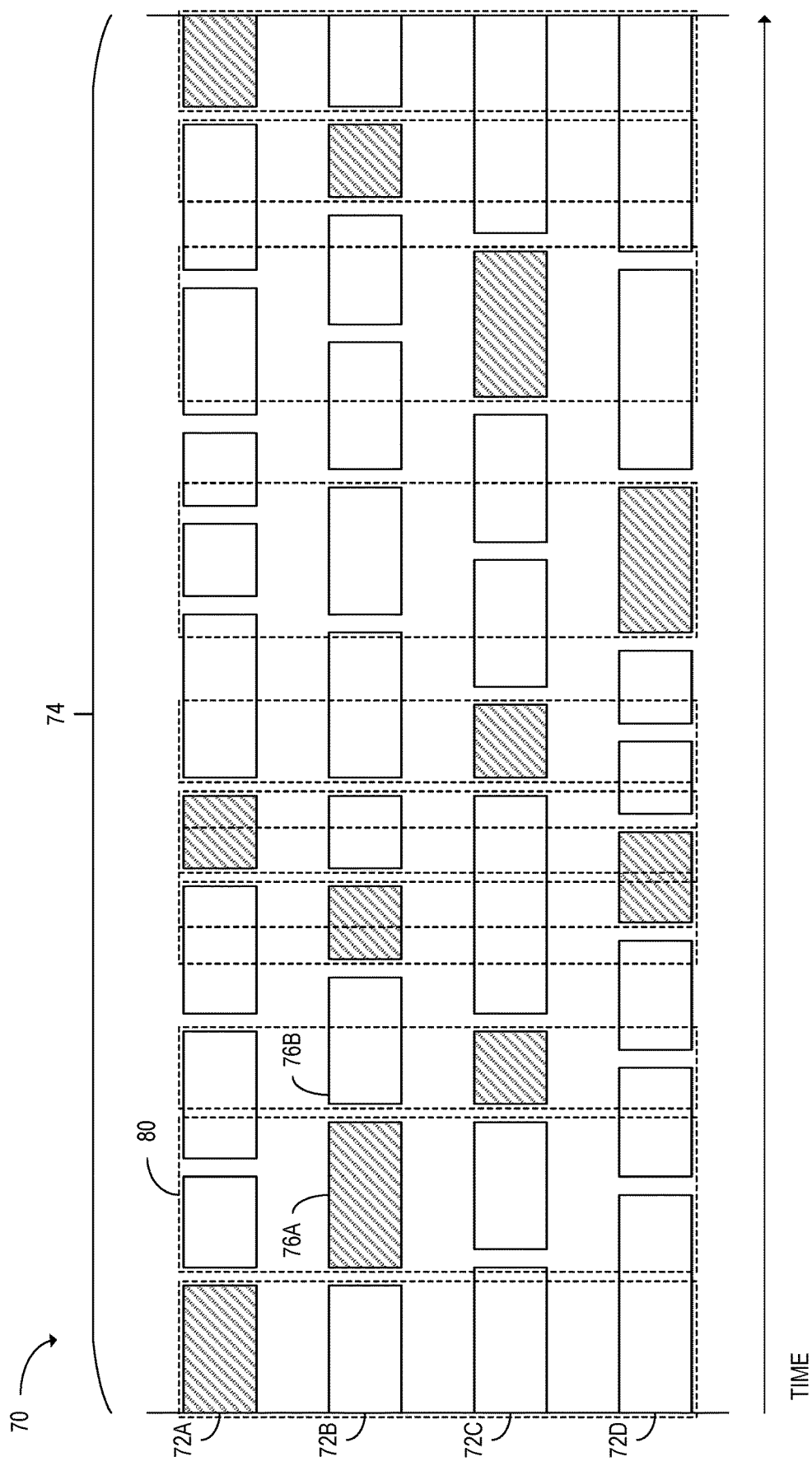
FIG. 4A shows the example processor thread timeline of FIG. 2A when the performance data for a first task is sampled over a plurality of selected task execution time intervals that are non-contiguous in time.

In some examples, the aggregated view 60 may show respective processor thread representations 44 of a plurality of processor threads executed during an application execution time interval 74 in which the application-under-test 20 was executed. FIG. 4A schematically shows the processor thread timeline 70 of FIG. 2A in an example in which the performance data 30 associated with the first task is sampled over a plurality of selected task execution time intervals 80 that are non-contiguous in time. The aggregated view 60 may show, for the application execution time interval 74, representations of the plurality of selected task instances 54 and representations of a plurality of other task instances that are displayed in a visually distinguishable manner, as depicted in the example of FIG. 4A. In the example of FIG. 4A, some of the selected task execution time intervals 80 overlap with each other, while other selected task execution time intervals 80 are separated from the other selected task execution time intervals 80 by gaps. By sampling over non-contiguous portions of the application execution time interval 74, the processor 12 may be configured to sample performance data 30 that is specific to periods of time in which the selected task 52 is executed. In addition, sampling non-contiguous selected task execution time intervals 80 may allow larger amounts of performance data 30 to be used in statistical analyses.

Returning to FIG. 3, in examples in which the performance data 30 includes execution durations 32, the processor 12 may be further configured to receive a duration range selection 51 of a duration range 62 at the GUI 40. The duration range 62 may be a range of execution durations 32 for the selected task 52. In response to receiving the duration range selection 51, the processor 12 may be further configured to output, for display at the GUI 40, an indication of one or more selected task instances 54 of the plurality of selected task instances 54 with respective execution durations 32 within the duration range 62. Additionally or alternatively to the duration range selection 51, the processor 12 may be further configured to receive a sampling interval selection 53 via user interaction with the task selector 48. The sampling interval selection 53 may indicate the application execution time interval 74 for which performance data 30 is depicted in the aggregated view 60.

Figure 4B:
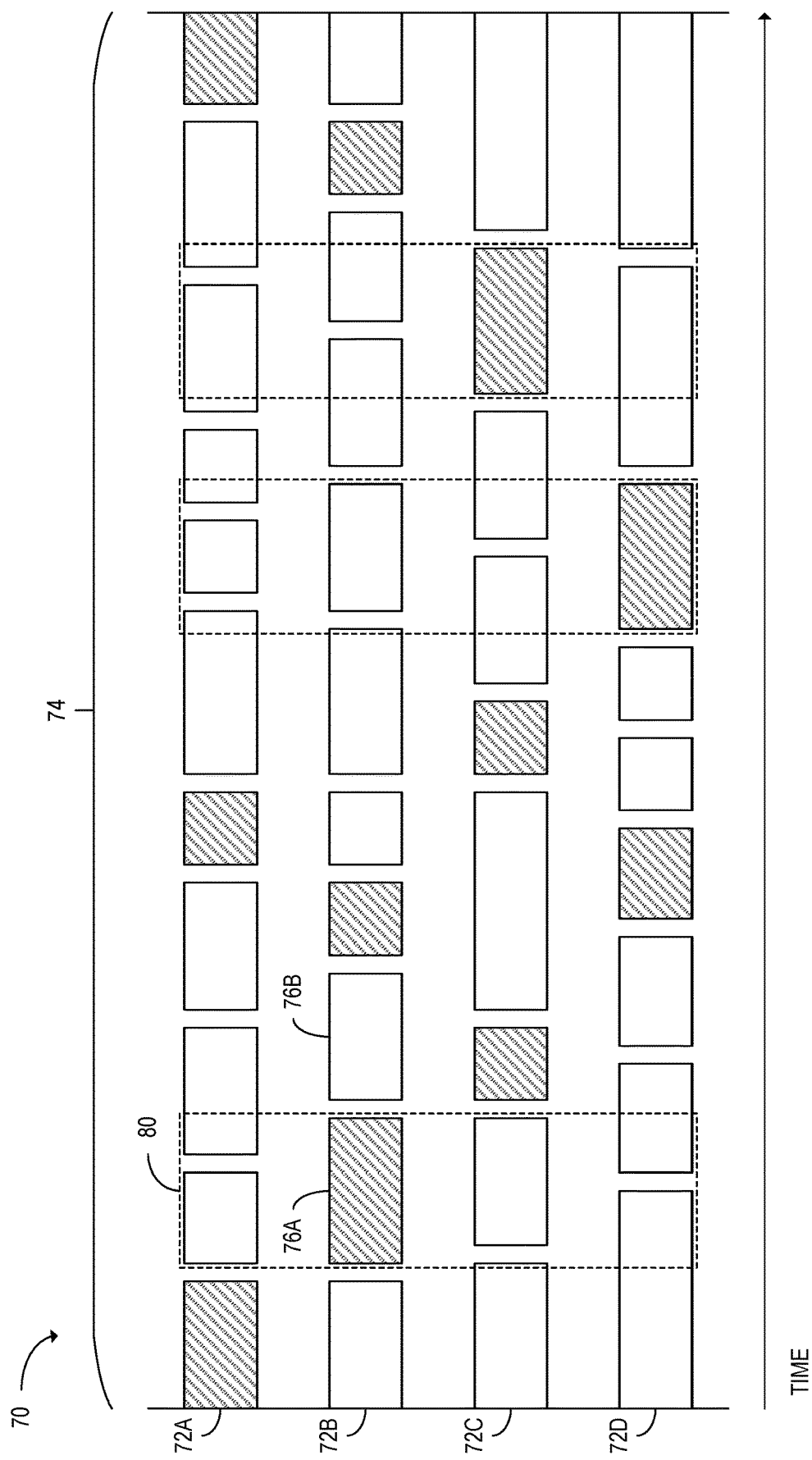
FIG. 4B shows the example processor thread timeline of FIG. 2A when a plurality of outlier task instances are indicated.

When the processor 12 receives a duration range selection 51, the duration range 62 may include all selected task instances 54 with execution durations 32 above a value specified by the duration range selection 51. For example, the duration range selection 51 may indicate a performance budget or a P90 value. Thus, the processor 12 may be configured to indicate, in the aggregated view 60, one or more outlier task instances of the plurality of selected task instances 54 that have corresponding execution durations 32 above a predetermined duration threshold or a predetermined duration percentile. FIG. 4B schematically shows the processor thread timeline 70 of FIG. 2A when a plurality of outlier task instances are indicated in the aggregated view 60.

Figure 5A:
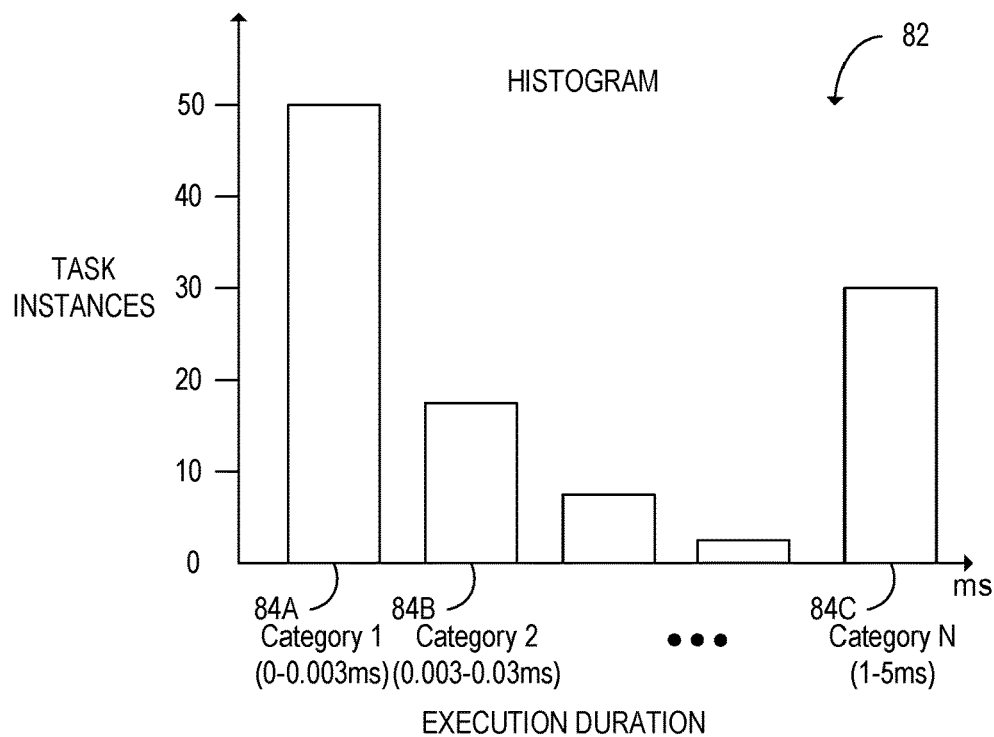
FIG. 5A shows an example histogram of task execution durations for the plurality of first task instances shown in FIG. 2A.
Figure 5B:
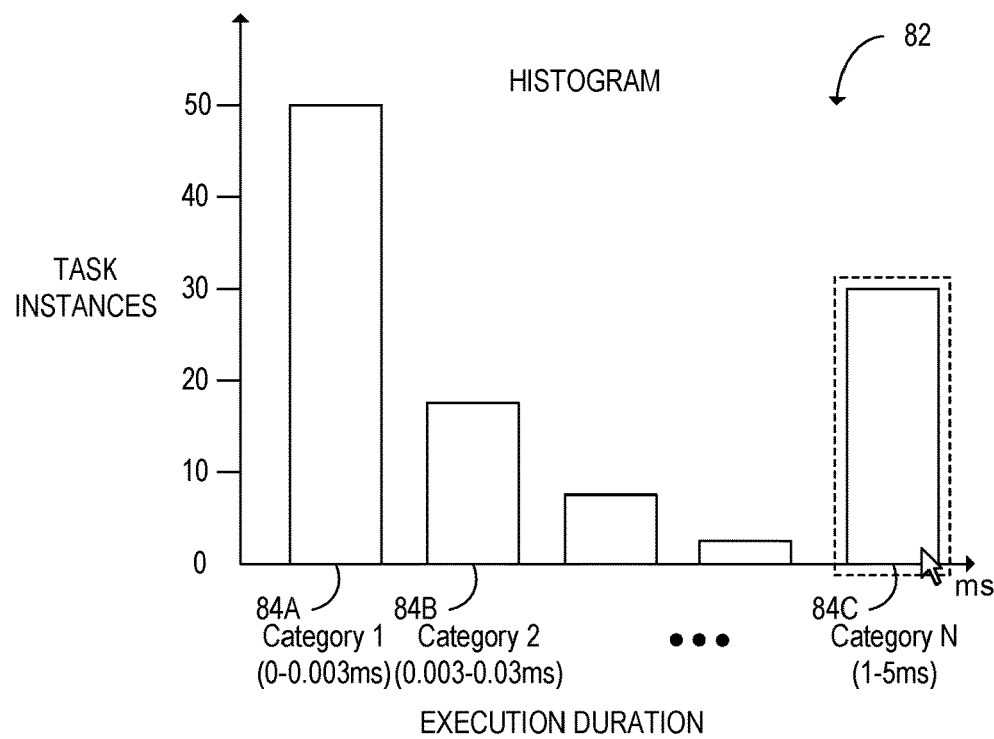
FIG. 5B shows the example histogram of FIG. 5A when a bin corresponding to the outlier task instances of FIG. 4B is selected.

In some examples, the aggregated view 60 may show the performance data 30 for the plurality of selected task instances 54 in a plot representation 49. In such examples, a histogram or a density plot may be used to show the performance data 30 for the plurality of selected task instances 54. For example, when the performance data 30 includes the execution durations 32 of the selected task instances 54, the aggregated view 60 may include a histogram or a density plot of the execution durations 32 of the plurality of selected task instances 54. FIG. 5A shows an example histogram 82 of the execution durations 32 of the first task instances 76A of FIG. 2A. In the example histogram 82 of FIG. 5A, the first task instances 76A are binned into a first category 84A, a second category 84B, a third category 84C, and other unlabeled categories based on their execution durations 32. FIG. 5B shows the example histogram 82 of FIG. 5B when the user has selected the third category 84C, which corresponds to the outlier task instances indicated in FIG. 4B. The outlier determination may be made by selection of a suitable outlier determination algorithm. In one example form, the outlier detection algorithm may simply identify the duration range with a top threshold percent of task instances, such as a threshold of the top 5%, 1% or 0.5% of task instance durations. In other examples, the outlier detection algorithm may dynamically determine the duration range of the outlier category by examining the distribution of the data in the histogram. By selecting the third category 84C at the GUI 40, the user may make a duration range selection 51 of the duration range 62 of the selected task instances 54 included in the third category 84C. Accordingly, in the example of FIG. 5B, the processor thread timeline 70 of FIG. 4B may be displayed in response to the user selecting the third category 84C for display in a processor thread representation 44.

Other types of performance data 30, such as numbers of cache misses 34, numbers of dropped packets 36, or amounts of memory 38 allocated to selected task instances 54, may also be shown in a plot representation 49 using a histogram or a density plot. When such a performance data variable is displayed in the aggregated view 60 in a histogram or a density plot, the processor 12 may be further configured to receive a user selection of a range of that performance data variable. The processor 12 may be further configured to output, for display at the GUI 40, an alternate view of the values of that performance data variable for selected task instances 54 within the selected range. For example, the values of that performance data variable for the plurality of selected task instances 54 that fall within the selected range may be presented in a processor thread representation 44 or in a table representation 46.

FIG. 6A shows a table representation 46 included in the aggregated view 60 of the performance data 30 for a plurality of selected task instances 54, according to one example. In this example, the application-under-test is a video game. In the table representation 46 shown in FIG. 6A, a hierarchy of a plurality of tasks 22 is displayed. The user may expand or collapse levels of the view of the hierarchy shown in the table representation 46 by selecting the triangle icons adjacent to the names of the tasks 22.

The table representation 46 further includes columns indicating inclusive execution percentages, exclusive execution percentages, inclusive execution numbers, exclusive execution numbers, and numbers of threads used to execute the tasks 22 included in the application-under-test 20. The inclusive execution percentage for a task 22 is the percentage of the total execution number of task instances 24 in the application-under-test in which the task 22 was executed. The exclusive execution percentage for a task 22 is the inclusive execution percentage minus the respective inclusive execution percentage of each child task of the task 22. The inclusive execution number is the total number of task instances 24 of the task 22 that were executed. The exclusive execution number is the inclusive execution number minus the total number of task instances 24 of the child tasks of the task 22 that were executed. In some examples, the table representation 46 may additionally or alternatively show inclusive execution time percentages and/or exclusive execution time percentages for the tasks 22. The inclusive execution time percentage for a task 22 is the percentage of the total execution time of the application-under-test 20 spent executing task instances 24 of the task 22. The exclusive execution time percentage is the inclusive execution time percentage minus the percentages of the total execution time spent executing task instances 24 of child tasks of the task 22. When the application-under-test 20 is run on multiple processor cores, the inclusive execution percentages, exclusive execution percentages, inclusive execution numbers, exclusive execution numbers, inclusive execution time percentages, exclusive execution time percentages, and numbers of threads used to execute the tasks 22 may be determined on a per-core basis or on a total basis across all the processor cores.

Figure 6B:
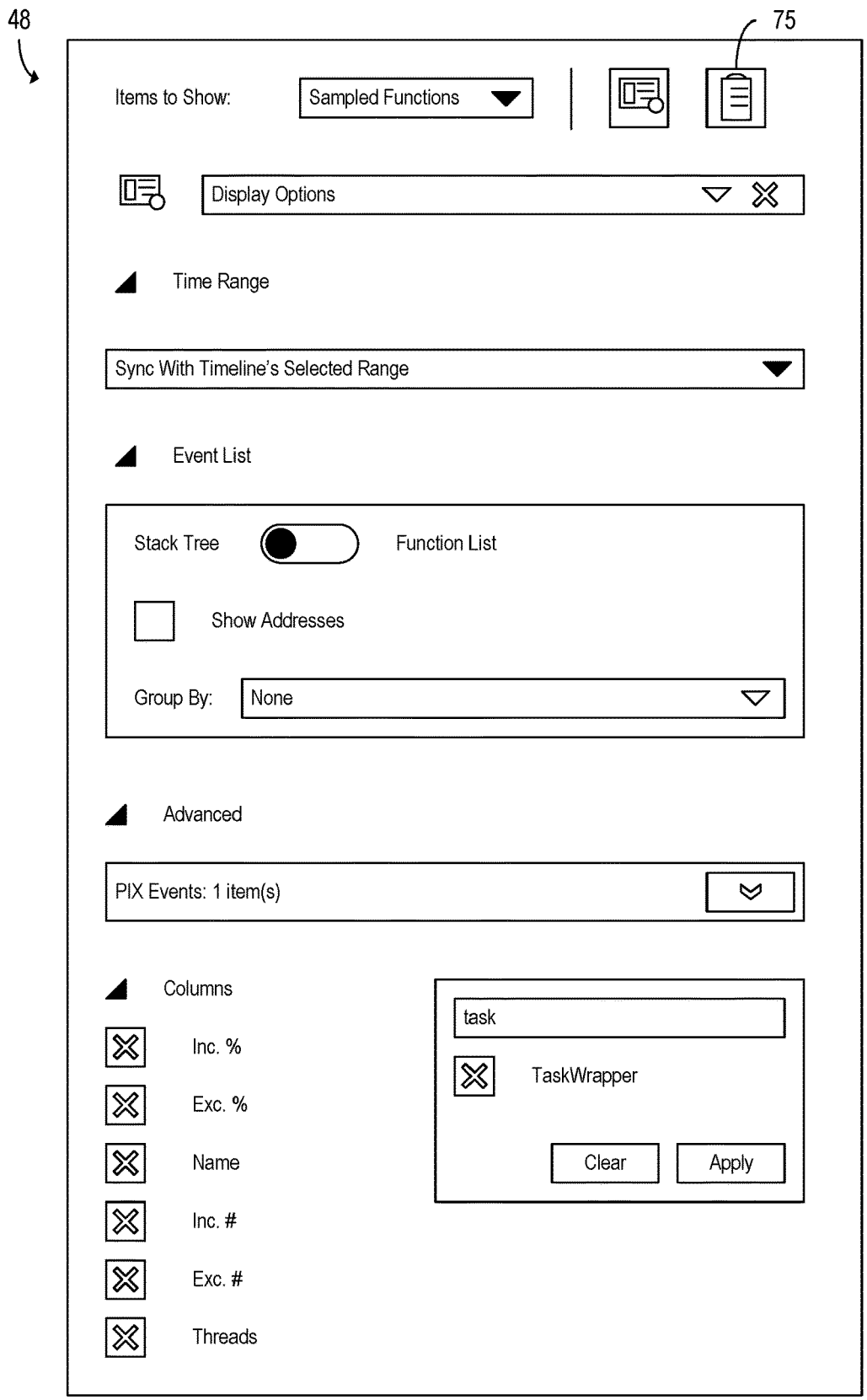
FIG. 6B shows an example task selector that may be included in the GUI along with the example table representation of FIG. 6A.

FIG. 6B shows an example task selector 48 at which the user may input a task selection 50. In the example of FIGS. 6A-6B, the selected task 52 is TaskWrapper. Thus, in FIG. 6A, the table view 46 shows an aggregated view 60 of the hierarchy of tasks 22 when TaskWrapper has been selected at the task selector 48 of FIG. 6B. The task selector 48 of FIG. 6B further includes a "Time Range" selection icon at which the user may select a time range within which to identify selected task instances 54. At the task selector 48, the user may further specify display options for the aggregated view 60, including what columns to display and whether the tasks 22 are displayed in a stack tree or a function list.

The task selector 48 of FIG. 6B further includes an export icon 75. In response to the user selecting the export icon 75 included in the task selector 48 of FIG. 6B, the processor 12 may be further configured to export the performance data 30 for the selected task instances 54 for storage in the memory 14 or for processing at another application program. The performance data 30 for one or more other task instances 24 executed concurrently with the selected task instances 54 may also be exported in response to selection of the export icon 75.

FIG. 7 shows an example histogram 100 of the execution durations 32 of the selected task instances 54 when TaskWrapper is the selected task 52, as shown in the example of FIGS. 6A-6B. In the example histogram 100 of FIG. 7, an outlined region 102 includes all the selected task instances 54 that have execution durations 32 above the P90 value. The outlined region 102 further includes a dotted line that marks a P99 (99th percentile) value for the execution durations 32. Thus, by referring to the histogram 100 for a selected task 52, the user may determine whether one or more selected task instances 54 of that selected task 52 exhibit outlier behavior. In some examples, the outlined region 102 may be selectable by the user to display, in a table representation 46 or a processor thread representation 44, the selected task instances 54 that are included in the outlined region 102. Accordingly, the user may view the contexts in which the outlier behavior of those selected task instances 54 occurred when executing the application-under-test 20. For example, by referring to a processor thread representation 44, the user may view what other tasks 22 were executed when the selected task instances 54 above the P90 threshold were executed. Additionally or alternatively, when the selected task 52 includes one or more other tasks 22, the user may view the performance data 30 for one or more outlier instances of the selected task 52 in the table representation 46 to identify the one or more other tasks 22 included in the selected task 52 that are responsible for the outlier performance. This identification may be performed even when the selected task instances 54 that exhibit outlier performance are not contiguous in time.

In one example use case scenario, the application-under-test 20 may be a video game and the selected task 52 may be a timestep task for a physics engine. The timestep task may include a plurality of sub-tasks such as a collision detection sub-task, a candidate updated position identification sub-task, an object position updating sub-task, and an angular orientation updating sub-task. When the user selects the timestep task at the GUI 40, the processor 12 may be configured to generate a histogram of execution durations 32 for the timestep task and output the histogram for display at the GUI 40. The histogram of execution durations 32 may indicate one or more selected task instances 54 that have respective execution durations 32 exceeding a performance budget. For example, the one or more selected task instances 54 may be indicated by an outlined or highlighted region of the histogram. When the user selects the outlined or highlighted region, the processor 12 may be further configured to output an aggregated view 60 including a processor thread representation 44 or a table representation 46 of the execution durations 32 for the timestep task. Thus, for example, the user may view a table representation 46 of the timestep task and its sub-tasks and determine that in selected task instances 54 in which the timestep task exceeded the performance budget, a large number of instances of the candidate updated position identification sub-task were performed. By accessing the aggregated view 60 for the timestep task, the user may thereby determine a cause of the outlier behavior of the timestep task.

Figure 8A:
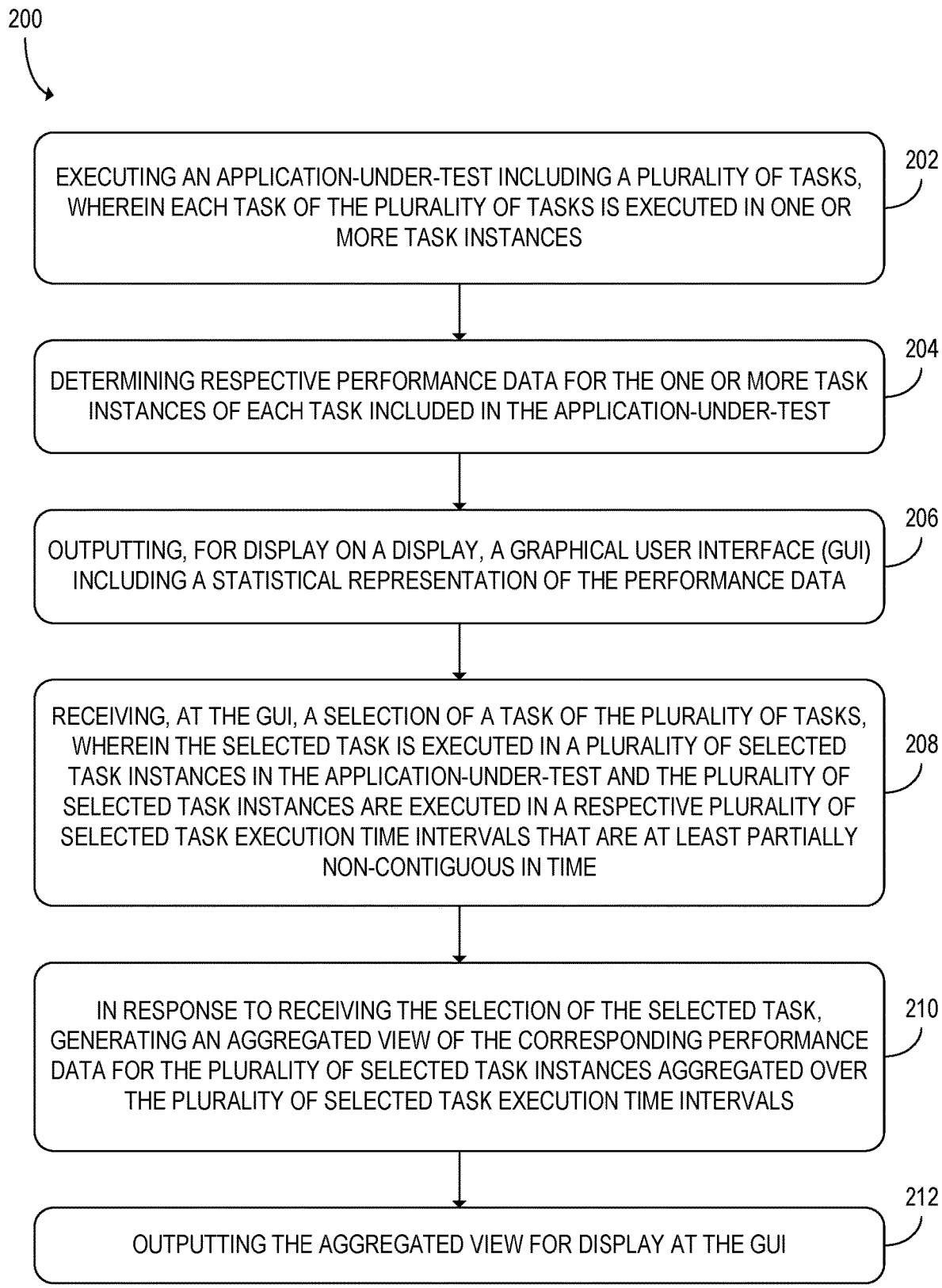
FIG. 8A shows a flowchart of an example method for use with a computing device to assess the performance of tasks included in an application-under-test, according to the example of FIG. 1.

FIG. 8A shows a flowchart of an example method 200 for use with a computing device to assess the performance of tasks included in an application-under-test. The method 200 may be used with the computing device 10 of FIG. 1 or with some other computing device. At step 202, the method 200 may include executing an application-under-test including a plurality of tasks. Each task of the plurality of tasks is executed in one or more task instances. For example, each task instance may be an instance in which a function is called when executing the application-under-test.

At step 204, the method 200 may further include determining respective performance data for the one or more task instances of each task included in the application-under-test. The performance data for a task instance may, for example, include an execution duration of the task instance, a number of cache misses that occurred when executing the task instance, a number of packets that were dropped when executing the task instance, an amount of memory allocated to the task instance, or a value of some other performance-related variable for the task instance.

At step 206, the method 200 may further include outputting, for display on a display, a GUI including a statistical representation of the performance data. The display to which the GUI is output may be included in the computing device at which the method 200 is performed. Alternatively, the computing device may be a server computing device the display may be included in a client computing device that is configured to receive GUI data from the server computing device. The statistical representation may, for example, be a table representation of the performance data and the plurality of task instances for which that performance data was collected. Alternatively, the statistical representation may be a processor thread representation that shows the task instances executed on a plurality of processor threads during an application execution time interval in which the application-under-test was executed.

At step 208, the method 200 may further include receiving, at the GUI, a selection of a task of the plurality of tasks. The selected task may be executed in a plurality of selected task instances in the application-under-test. In addition, the plurality of selected task instances may be executed in a respective plurality of selected task execution time intervals that are at least partially non-contiguous in time. Thus, rather than selecting a long period of time that includes intervals in which the selected task was not performed, or selecting a short period of time in which one or more contiguous executions of the selected task were performed, the user may specifically sample intervals in which the selected task was performed even when those intervals are not contiguous.

At step 210, in response to receiving the selection of the selected task, the method 200 may further include generating an aggregated view of the corresponding performance data for the plurality of selected task instances aggregated over the plurality of selected task execution time intervals. At step 212, the method 200 may further include outputting the aggregated view for display at the GUI. The performance data for tasks other than the selected task may be hidden in the aggregated view. Thus, the performance data presented to the user in the GUI may be narrowed to specifically show the selected task instances without the user having to manually sort the performance data. In examples in which the computing device is a server computing device configured to communicate with a client computing device, step 212 may include transmitting the aggregated view to the client computing device over a network.

In some examples, the respective performance data for the plurality of selected task instances may include respective execution durations of the plurality of selected task instances. In examples in which the performance data includes execution durations of the selected task instances, the application-under-test may further include a respective task instance beginning marker and a respective task instance ending marker for each of the plurality of selected task instances. The aggregated view may, in such examples, indicate the plurality of selected task execution time intervals, as indicated by the task instance beginning markers and the task instance ending markers of the selected task instances. The task execution time intervals may, for example, be shown in a processor thread representation for each of a plurality of processor threads. Additionally or alternatively, the plurality of task execution time intervals may be indicated in a table representation, which may indicate respective times associated with the task instance beginning markers and the task instance ending markers.

The performance data displayed for the plurality of selected task instances may include quantities other than execution durations in some examples. For example, the respective performance data for the plurality of selected task instances may include respective numbers of cache misses for the plurality of selected task instances. As another example, the respective performance data for the plurality of selected task instances may include respective numbers of dropped packets for the plurality of selected task instances. Additionally or alternatively, the respective performance data for the plurality of selected task instances may include respective amounts of memory allocated to the plurality of selected task instances.

Figure 8B:
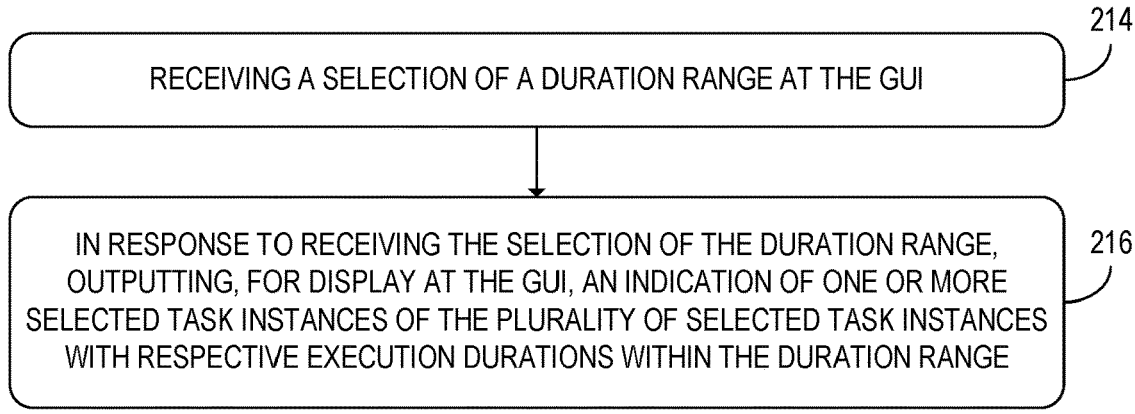
FIG. 8B shows additional steps of the method of FIG. 8A that may be performed in some examples when the performance data includes respective execution durations of the plurality of selected task instances.

FIG. 8B shows additional steps of the method 200 that may be performed in some examples when the performance data includes respective execution durations of the plurality of selected task instances. At step 214, the method 200 may further include receiving a selection of a duration range at the GUI. The duration range is a range of execution durations for the plurality of selected task instances. In some examples, the duration range may be bounded on both ends, whereas in other examples, the duration range may include all execution durations above or below a cutoff value. The cutoff value may be a predetermined duration value (e.g. a performance budget) or a predetermined duration percentile (e.g. $90^{th}$ percentile). The duration range may be received via user interaction with the task selector or with some other GUI element.

At step 216, the method 200 may further include outputting, for display at the GUI, an indication of one or more selected task instances of the plurality of selected task instances with respective execution durations within the duration range. The indication may be output for display at the GUI as at least a portion of the aggregated view in response to receiving the selection of the duration range. In examples in which the duration range includes all execution durations above a predetermined duration threshold or a predetermined duration percentile, the aggregated view may indicate one or more outlier task instances of the plurality of selected task instances that have corresponding execution durations above the predetermined duration threshold or the predetermined duration percentile.

In examples in which the performance data includes values of one or more other performance variables in addition to or alternatively to execution durations, the steps of FIG. 8B may be performed for the one or more other performance variables. When the above steps are performed for a performance variable other than execution duration, a range for that performance variable may be received instead of execution duration. For example, the method 200 may include receiving a range of amounts of memory allocated to a selected task. In addition, the method 200 may further include outputting, to the GUI, an indication of one or more selected task instances with corresponding values of the performance variable within the selected range.

Although the above examples discuss identification of outlier task instances that have unusually high execution durations, numbers of cache misses, numbers of dropped packets, or amounts of memory allocated, the devices and methods discussed above may alternatively be used to identify outlier task instances that have unusually low values of such variables. For example, a user may select a duration range that is bounded below at zero and bounded above at a predetermined duration threshold that indicates a maximum duration. As another example, at a histogram included in the aggregated view, the user may select the task instances with respective execution times in the lowest decile.

Using the devices and methods discussed above, a user who seeks to analyze the performance of an application-under-test may access performance data for non-contiguous instances in which a selected task is executed. In addition, when the user accesses the performance data for such non-contiguous task instances, the user may access the performance data for one or more other task instances that were executed concurrently with, executed proximate to, or included in the selected task instances. The devices and methods discussed above may also enable the user to extract performance data related to the selected task in order to perform further statistical analyses. Thus, using the devices and methods discussed above, the user may identify patterns in the execution of the application-under-test that lead to anomalous performance.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
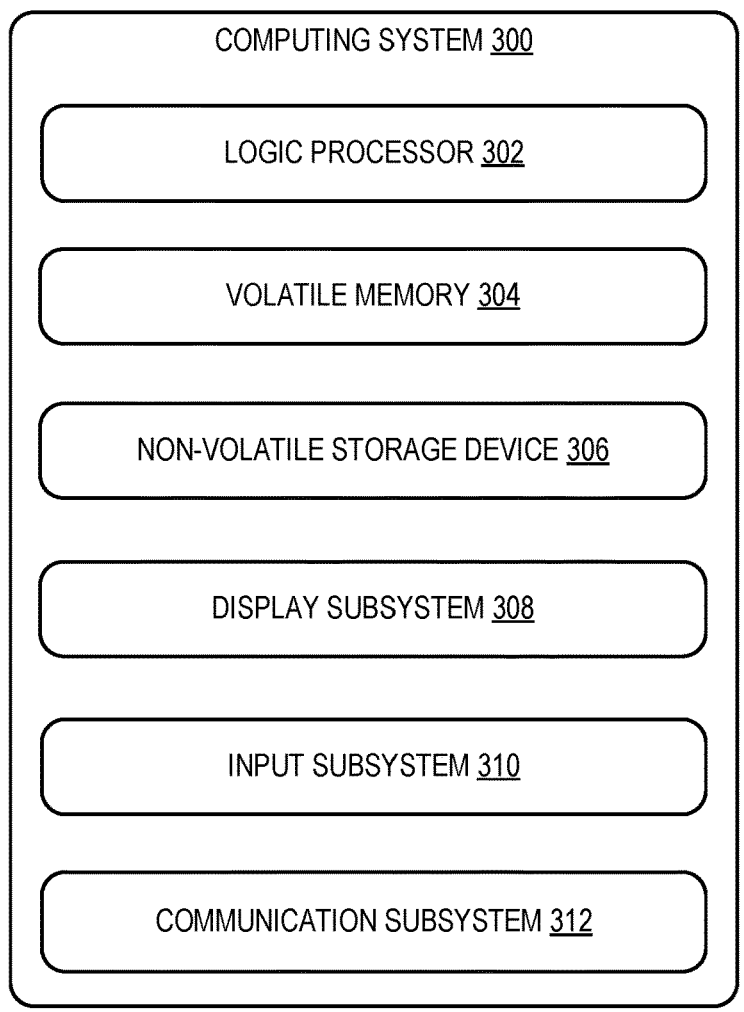
FIG. 9 shows a schematic view of an example computing environment in which the computing device of FIG. 1 may be enacted.

FIG. 9 schematically shows a non-limiting embodiment of a computing system 300 that can enact one or more of the methods and processes described above. Computing system 300 is shown in simplified form. Computing system 300 may embody the computing device 10 described above and illustrated in FIG. 1. One or more components of the computing system 300 may be instantiated in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 9.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing device is provided, including a processor configured to execute an application-under-test including a plurality of tasks. Each task of the plurality of tasks may be executed in one or more task instances. The processor may be further configured to determine respective performance data for the one or more task instances of each task included in the application-under-test. The processor may be further configured to output, for display on a display, a graphical user interface (GUI) including a statistical representation of the performance data. The processor may be further configured to receive, at the GUI, a selection of a task of the plurality of tasks. The selected task may be executed in a plurality of selected task instances in the application-under-test. The plurality of selected task instances may be executed in a respective plurality of selected task execution time intervals that are at least partially non-contiguous in time. In response to receiving the selection of the selected task, the processor may be further configured to generate an aggregated view of the corresponding performance data for the plurality of selected task instances aggregated over the plurality of selected task execution time intervals. The processor may be further configured to output the aggregated view for display at the GUI.

According to this aspect, the respective performance data for the plurality of selected task instances may include respective execution durations of the plurality of selected task instances.

According to this aspect, for each of the plurality of selected task instances, the application-under-test may further include a respective task instance beginning marker and a respective task instance ending marker. The aggregated view may further indicate the plurality of selected task execution time intervals, as indicated by the task instance beginning markers and the task instance ending markers of the selected task instances.

According to this aspect, the aggregated view may further indicate one or more outlier task instances of the plurality of selected task instances that have corresponding execution durations above a predetermined duration threshold or a predetermined duration percentile.

According to this aspect, the processor may be further configured to receive a selection of a duration range at the GUI. In response to receiving the selection of the duration range, the processor may be further configured to output, for display at the GUI, an indication of one or more selected task instances of the plurality of selected task instances with respective execution durations within the duration range.

According to this aspect, the aggregated view may include a histogram or a density plot of the execution durations of the plurality of selected task instances.

According to this aspect, the respective performance data for the plurality of selected task instances may include respective numbers of cache misses for the plurality of selected task instances.

According to this aspect, the respective performance data for the plurality of selected task instances may include respective numbers of dropped packets for the plurality of selected task instances.

According to this aspect, the respective performance data for the plurality of selected task instances may include respective amounts of memory allocated to the plurality of selected task instances.

According to this aspect, the aggregated view may show respective processor thread representations of a plurality of processor threads executed during an application execution time interval in which the application-under-test was executed.

According to this aspect, the aggregated view may show, for the selected time interval, representations of the plurality of selected task instances and representations of a plurality of other task instances that are displayed in a visually distinguishable manner.

According to another aspect of the present disclosure, a method for use with a computing device is provided. The method may include executing an application-under-test including a plurality of tasks. Each task of the plurality of tasks may be executed in one or more task instances. The method may further include determining respective performance data for the one or more task instances of each task included in the application-under-test. The method may further include outputting, for display on a display, a graphical user interface (GUI) including a statistical representation of the performance data. The method may further include receiving, at the GUI, a selection of a task of the plurality of tasks. The selected task may be executed in a plurality of selected task instances in the application-under-test. The plurality of selected task instances may be executed in a respective plurality of selected task execution time intervals that are at least partially non-contiguous in time. The method may further include, in response to receiving the selection of the selected task, generating an aggregated view of the corresponding performance data for the plurality of selected task instances aggregated over the plurality of selected task execution time intervals. The method may further include outputting the aggregated view for display at the GUI.

According to this aspect, the respective performance data for the plurality of selected task instances may include respective execution durations of the plurality of selected task instances.

According to this aspect, for each of the plurality of selected task instances, the application-under-test may further include a respective task instance beginning marker and a respective task instance ending marker. The aggregated view may further indicate the plurality of selected task execution time intervals, as indicated by the task instance beginning markers and the task instance ending markers of the selected task instances.

According to this aspect, the aggregated view may further indicate one or more outlier task instances of the plurality of selected task instances that have corresponding execution durations above a predetermined duration threshold or a predetermined duration percentile.

According to this aspect, the respective performance data for the plurality of selected task instances may include respective numbers of cache misses for the plurality of selected task instances.

According to this aspect, the respective performance data for the plurality of selected task instances may include respective numbers of dropped packets for the plurality of selected task instances.

According to this aspect, the respective performance data for the plurality of selected task instances may include respective amounts of memory allocated to the plurality of selected task instances.

According to this aspect, the aggregated view may show respective processor thread representations of a plurality of processor threads executed during an application execution time interval in which the application-under-test was executed.

According to another aspect of the present disclosure, a computing device is provided, including a processor configured to execute an application-under-test including a plurality of tasks. Each task of the plurality of tasks may be executed in one or more task instances. For each of the plurality of selected task instances, the application-under-test may further include a respective task instance beginning marker and a respective task instance ending marker. The processor may be further configured to determine respective performance data for the one or more task instances of each task included in the application-under-test. The processor may be further configured to output, for display on a display, a graphical user interface (GUI) including a statistical representation of the performance data. The processor may be further configured to receive, at the GUI, a selection of a task of the plurality of tasks. The selected task may be executed in a plurality of selected task instances in the application-under-test. The plurality of selected task instances may be executed in a respective plurality of selected task execution time intervals that are at least partially non-contiguous in time. In response to receiving the selection of the selected task, the processor may be further configured to generate an aggregated view of the corresponding performance data for the plurality of selected task instances aggregated over the plurality of selected task execution time intervals, as indicated by the task instance beginning markers and the task instance ending markers of the selected task instances. The respective performance data for one or more other task instances of one or more other tasks of the plurality of tasks may be hidden in the aggregated view. The processor may be further configured to output the aggregated view for display at the GUI. The processor may be further configured to receive, at the GUI, a selection of a range for a performance variable included in the performance data. The performance variable may be an execution duration, a number of cache misses, a number of dropped packets, or an amount of memory allocated. In response to receiving the selection of the range, the processor may be further configured to output, for display at the GUI in the aggregated view, an indication of one or more selected task instances of the plurality of selected task instances with respective values of the performance variable within the range.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to:
execute an application-under-test including a plurality of tasks, wherein each task of the plurality of tasks is executed in one or more task instances;
determine respective performance data for the one or more task instances of each task included in the application-under-test;
output, for display on a display, a graphical user interface (GUI) including a statistical representation of the performance data;
receive, at the GUI, a selection of a task of the plurality of tasks, wherein:
the selected task is executed in a plurality of selected-task instances in the application-under-test;
the plurality of selected-task instances are executed in a respective plurality of selected-task execution time intervals that are at least partially non-contiguous in time; and
the plurality of selected-task instances are interspersed with one or more gaps within which none of the selected-task instances are executed;
in response to receiving the selection of the selected task, generate an aggregated view of the corresponding performance data for the plurality of selected-task instances aggregated over the plurality of selected-task execution time intervals; and
output the aggregated view for display at the GUI.

2. The computing device of claim 1, wherein the respective performance data for the plurality of selected-task instances includes respective execution durations of the plurality of selected-task instances.

3. The computing device of claim 2, wherein:
for each of the plurality of selected-task instances, the application-under-test further includes a respective task instance beginning marker and a respective task instance ending marker;
the aggregated view further indicates the plurality of selected-task execution time intervals, as indicated by the task instance beginning markers and the task instance ending markers of the selected-task instances.

4. The computing device of claim 2, wherein the aggregated view further indicates one or more outlier task instances of the plurality of selected-task instances that have corresponding execution durations above a predetermined duration threshold or a predetermined duration percentile.

5. The computing device of claim 2, wherein the processor is further configured to:
receive a selection of a duration range at the GUI; and
in response to receiving the selection of the duration range, output, for display at the GUI, an indication of one or more selected-task instances of the plurality of selected-task instances with respective execution durations within the duration range.

6. The computing device of claim 2, wherein the aggregated view includes a histogram or a density plot of the execution durations of the plurality of selected-task instances.

7. The computing device of claim 1, wherein the respective performance data for the plurality of selected-task instances includes respective numbers of cache misses for the plurality of selected-task instances.

8. The computing device of claim 1, wherein the respective performance data for the plurality of selected-task instances includes respective numbers of dropped packets for the plurality of selected-task instances.

9. The computing device of claim 1, wherein the respective performance data for the plurality of selected-task instances includes respective amounts of memory allocated to the plurality of selected-task instances.

10. The computing device of claim 1, wherein the aggregated view shows respective processor thread representations of a plurality of processor threads executed during an application execution time interval in which the application-under-test was executed.

11. The computing device of claim 10, wherein the aggregated view shows, for the selected time interval, representations of the plurality of selected-task instances and representations of a plurality of other task instances that are displayed in a visually distinguishable manner.

12. A method for use with a computing device, the method comprising:
   executing an application-under-test including a plurality of tasks, wherein each task of the plurality of tasks is executed in one or more task instances;
   determining respective performance data for the one or more task instances of each task included in the application-under-test;
   outputting, for display on a display, a graphical user interface (GUI) including a statistical representation of the performance data;
   receiving, at the GUI, a selection of a task of the plurality of tasks, wherein:
      the selected task is executed in a plurality of selected-task instances in the application-under-test;
      the plurality of selected-task instances are executed in a respective plurality of selected-task execution time intervals that are at least partially non-contiguous in time; and
         the plurality of selected-task instances are interspersed with one or more gaps within which none of the selected-task instances are executed;
   in response to receiving the selection of the selected task, generating an aggregated view of the corresponding performance data for the plurality of selected-task instances aggregated over the plurality of selected-task execution time intervals; and
   outputting the aggregated view for display at the GUI.

13. The method of claim 12, wherein the respective performance data for the plurality of selected-task instances includes respective execution durations of the plurality of selected-task instances.

14. The method of claim 13, wherein:
   for each of the plurality of selected-task instances, the application-under-test further includes a respective task instance beginning marker and a respective task instance ending marker;
   the aggregated view further indicates the plurality of selected-task execution time intervals, as indicated by the task instance beginning markers and the task instance ending markers of the selected-task instances.

15. The method of claim 13, wherein the aggregated view further indicates one or more outlier task instances of the plurality of selected-task instances that have corresponding execution durations above a predetermined duration threshold or a predetermined duration percentile.

16. The method of claim 12, wherein the respective performance data for the plurality of selected-task instances includes respective numbers of cache misses for the plurality of selected-task instances.

17. The method of claim 12, wherein the respective performance data for the plurality of selected-task instances includes respective numbers of dropped packets for the plurality of selected-task instances.

18. The method of claim 12, wherein the respective performance data for the plurality of selected-task instances includes respective amounts of memory allocated to the plurality of selected-task instances.

19. The method of claim 12, wherein the aggregated view shows respective processor thread representations of a plurality of processor threads executed during an application execution time interval in which the application-under-test was executed.

20. A computing device comprising:
   a processor configured to:
      execute an application-under-test including a plurality of tasks, wherein:
         each task of the plurality of tasks is executed in one or more task instances; and
         for each of the plurality of task instances, the application-under-test further includes a respective task instance beginning marker and a respective task instance ending marker;
      determine respective performance data for the one or more task instances of each task included in the application-under-test;
      output, for display on a display, a graphical user interface (GUI) including a statistical representation of the performance data;
      receive, at the GUI, a selection of a task of the plurality of tasks, wherein:
         the selected task is executed in a plurality of selected-task instances in the application-under-test; and
         the plurality of selected-task instances are executed in a respective plurality of selected-task execution time intervals that are at least partially non-contiguous in time; and
         the plurality of selected-task instances are interspersed with one or more gaps within which none of the selected-task instances are executed;
      in response to receiving the selection of the selected task, generate an aggregated view of the corresponding performance data for the plurality of selected-task instances aggregated over the plurality of selected-task execution time intervals, as indicated by the task instance beginning markers and the task instance ending markers of the selected-task instances, wherein the respective performance data for one or more other task instances of one or more other tasks of the plurality of tasks are hidden in the aggregated view;
      output the aggregated view for display at the GUI;
      receive, at the GUI, a selection of a range for a performance variable included in the performance data, wherein the performance variable is an execution duration, a number of cache misses, a number of dropped packets, or an amount of memory allocated; and
      in response to receiving the selection of the range, output, for display at the GUI in the aggregated view, an indication of one or more selected-task instances of the plurality of selected-task instances with respective values of the performance variable within the range.

* * * * *